United States Patent
Mintz et al.

(10) Patent No.: US 11,615,364 B2
(45) Date of Patent: *Mar. 28, 2023

(54) MANAGING SALES OPPORTUNITIES WITHIN AN ORGANIZATION

(71) Applicant: DealCoachPro Inc., Delray Beach, FL (US)

(72) Inventors: Erik Mintz, Delray Beach, FL (US); Joseph Hennessey, Boynton Beach, FL (US); Joseph Simone, Sylva, NC (US); Lindes Roets, Naples, FL (US); Paritosh Patel, Parkland, FL (US); Ryan Jason Reed, Sarasota, FL (US); Bill Golder, Ada, MI (US)

(73) Assignee: DealCoachPro, Inc., Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,004

(22) Filed: Aug. 23, 2021

(65) Prior Publication Data

US 2021/0406800 A1 Dec. 30, 2021

Related U.S. Application Data

(63) Continuation of application No. 16/885,004, filed on May 27, 2020, now Pat. No. 11,100,447, which is a (Continued)

(51) Int. Cl.
*G06Q 10/00* (2023.01)
*G06Q 10/0637* (2023.01)
(Continued)

(52) U.S. Cl.
CPC ..... *G06Q 10/06375* (2013.01); *G06F 16/288* (2019.01); *G06Q 10/04* (2013.01);
(Continued)

(58) Field of Classification Search
None
See application file for complete search history.

(56) References Cited

U.S. PATENT DOCUMENTS

| 8,244,573 B2 * | 8/2012 | Hahn | G06Q 30/00 705/7.29 |
| 10,599,684 B2 * | 3/2020 | Bolcer | G06F 16/288 |

(Continued)

OTHER PUBLICATIONS

Rockey, Sally, Paylines, Percentiles and Success Rates, Feb. 15, 2011, Extramural Nexus, https://nexus.od.nih.gov/all/2011/02/15/paylines-percentiles-success-rates/, p. 1-15. (Year: 2011).*

(Continued)

*Primary Examiner* — Joseph M Waesco
(74) *Attorney, Agent, or Firm* — Fleit Intellectual Property Law; Jon Gibbons

(57) ABSTRACT

In some embodiments, a computer implemented method for determining and generating an electronic recommendation and/or other outputs, such as observations and tasks, in which the method may include the steps of receiving input from the user through a client device in which the input may include data for populating a key member or key player data record; identifying, via a computing device processor, a first rule corresponding to the key player data record; retrieving, via a computing device processor, a first observation in which the first observation is associated with the first rule; and displaying to the user, via a display screen of the client device, the first observation. In further embodiments of the method, an observation may be associated with a recommendation and the recommendation may include a prerecorded video multimedia file specific for the observation.

20 Claims, 18 Drawing Sheets

Related U.S. Application Data continuation-in-part of application No. 15/381,790, filed on Dec. 16, 2016, now Pat. No. 10,970,723.

(60) Provisional application No. 62/310,686, filed on Mar. 19, 2016.

(51) Int. Cl.
| | | |
|---|---|---|
| *G06Q 40/12* | (2023.01) | |
| *G06Q 30/0201* | (2023.01) | |
| *G06F 16/28* | (2019.01) | |
| *G06Q 30/01* | (2023.01) | |
| *G06Q 10/04* | (2023.01) | |
| *G06Q 10/105* | (2023.01) | |

(52) U.S. Cl.
CPC ........... *G06Q 10/105* (2013.01); *G06Q 30/01* (2013.01); *G06Q 30/0201* (2013.01); *G06Q 40/12* (2013.12)

(56) References Cited

U.S. PATENT DOCUMENTS

| | | | | |
|---|---|---|---|---|
| 2007/0204308 A1* | 8/2007 | Nicholas | ............ | H04N 7/17318 725/86 |
| 2008/0095339 A1* | 4/2008 | Elliott | ..................... | H04L 12/14 379/93.01 |
| 2008/0126476 A1* | 5/2008 | Nicholas | ................ | G06Q 10/10 709/203 |
| 2011/0106743 A1* | 5/2011 | Duchon | .................. | G06F 16/35 706/46 |
| 2011/0251868 A1* | 10/2011 | Mikurak | .......... | G06Q 10/06315 705/7.25 |
| 2012/0124073 A1* | 5/2012 | Gross | ...................... | H04L 65/61 707/767 |
| 2012/0185544 A1* | 7/2012 | Chang | ................... | G06Q 50/01 709/206 |
| 2012/0233258 A1* | 9/2012 | Vijayaraghavan | ........................... | G06Q 10/0637 709/204 |
| 2013/0204658 A1* | 8/2013 | Yogev | ................ | G06Q 30/0201 705/7.29 |
| 2014/0222610 A1* | 8/2014 | Mikurak | ............ | G06Q 30/0269 705/26.5 |
| 2015/0073929 A1* | 3/2015 | Psota | ................ | G06Q 30/0605 705/26.2 |
| 2015/0112755 A1* | 4/2015 | Potdar | ................ | G06Q 30/0201 705/7.29 |
| 2015/0112756 A1* | 4/2015 | Subramanian | ..... | G06Q 30/0201 705/7.29 |
| 2015/0112764 A1* | 4/2015 | Augustine | .......... | G06Q 30/0202 705/7.31 |
| 2015/0112893 A1* | 4/2015 | Subramanian | ..... | G06Q 10/0639 706/11 |
| 2016/0050447 A1* | 2/2016 | Nicholas | .......... | H04N 21/25891 725/14 |
| 2016/0253710 A1* | 9/2016 | Publicover | ......... | H04N 21/2187 705/14.66 |
| 2018/0027129 A1* | 1/2018 | Sharma | ............. | G06F 16/24573 379/112.09 |
| 2018/0068327 A1* | 3/2018 | Wagner | .................. | G06N 7/005 |
| 2019/0362397 A1* | 11/2019 | Psota | ................ | G06Q 30/0241 |

OTHER PUBLICATIONS

USPTO, Office Action, dated Apr. 26, 2019, U.S. Appl. No. 15/381,790, filed Feb. 16, 2016.
USPTO, Notice of Allowance, dated Jul. 9, 2021, U.S. Appl. No. 16/855,004, filed May 27, 2020.
USPTO, Office Action, dated Jul. 10, 2020, U.S. Appl. No. 15/381,790, filed Dec. 16, 2016.
USPTO, Notice of Allowance, dated Jan. 22, 2021, U.S. Appl. No. 15/381,790, filed Dec. 16, 2016.
Abidin, Mardhati, Technique for Order Performance by Similarity, 2016, Science Direct, https://pdf.sciencedirectassets.com/, p. 1-8 (Year: 2016).

* cited by examiner

FIG. 2

STEP – 4.
2ND ORDER NORMALIZATION CALCULATE DISTANCE FOR EACH KEY PLAYER COMBINATION.
CALCULATE THE DISTANCE OF THE INTEGER VECTORS REPRESENTING THE KEY PLAYERS RIPAA SCORES $$850 \sim d = \sqrt{(X_{rs} - X_{rt})^2 + (X_{is} - X_{it})^2 + (X_{ps} - X_{pt})^2 + (X_{ads} - X_{adt})^2 + (X_{acs} - X_{act})^2}$$

| S-KP# | 810 S-KP1 | 812 S-KP2 | 814 S-KP3 | 816 S-KP4 |
|---|---|---|---|---|
| T-KP1 | 820 11.09 | 822 7.55 | 824 11.22 | 826 9.43 |
| T-KP2 | 830 6.71 | 832 13.67 | 834 3.74 | 836 2.24 |
| T-KP3 | 840 6.71 | 842 12.45 | 844 4.24 | 846 3.00 |
| T-KP4 | 1.41 | 15.03 | 5.39 | 7.35 |

T-KP# →

802

| XRS = ROLE SOURCE  XRT = ROLE TARGET | XIS = IMPACT SOURCE  XIT = IMPACT TARGET | XPS = PRIORITY SOURCE  XPT = PRIORITY TARGET | XADS = ADVOCACY SOURCE  XADT = ADVOCACY TARGET | XACS = ACCESSIBILITY SOURCE  XACT = ACCESSIBILITY TARGET |
|---|---|---|---|---|

STEP - 5.
EXECUTE HUNGARIAN METHOD
DETERMINE OPTIMAL ASSIGNMENT OF MATCHING THE SOURCE AND TARGET KEY PLAYER RIPAA PROXIMITY.

DETERMINE MINIMIZED VALUE

| | 910 S-KP1 | 912 S-KP2 | 914 S-KP3 | 916 S-KP4 |
|---|---|---|---|---|
| T-KP1 | 920 11.09 | 922 (7.55) | 924 11.22 | 926 9.43 |
| T-KP2 | 930 6.71 | 932 13.67 | 934 3.74 | 936 (2.24) |
| T-KP3 | 940 6.71 | 942 12.45 | 944 (4.24) | 946 3.00 |
| T-KP4 | (1.41) | 15.03 | 5.39 | 7.35 |

902

S-KP# →

T-KP# ↑

950 — CALCULATE THE TOTAL RIPAA PROXIMITY SCORE = 1.41 + 7.55 + 4.24 + 2.24 = 15.44

FIG. 9

STEP – 6.
GENERATE RESULTS

PRESCOT CLOSEST MATCHING DEALS

- SCORE 15.44 — COMPANY R
- SCORE 15.74 — COMPANY J2
- SCORE 16.83 — COMPANY K
- SCORE 17.61 — UNIVERSITY MM
- SCORE 17.79 — COMPANY DZ

HUNGARIAN CALCULATIONS

STEP 1. FIND THE MIN. IN EACH ROW AND SUBTRACT FROM EACH ROW THE MIN VALUE

1102

|  | S-KP1 | S-KP2 | S-KP3 | S-KP4 | MIN. |
|---|---|---|---|---|---|
| T-KP1 | 11.09 | 7.55 | 11.22 | 9.43 | 7.55 |
| T-KP2 | 6.71 | 13.67 | 3.74 | 2.24 | 2.24 |
| T-KP3 | 6.71 | 12.45 | 4.24 | 3.00 | 3.00 |
| T-KP4 | 1.41 | 15.03 | 5.39 | 7.35 | 1.41 |

STEP 2. FIND THE MIN IN EACH COLUMN SUBTRACT FROM EACH COLUMN THE MIN VALUE IN EACH ROW

1106

|  | S-KP1 | S-KP2 | S-KP3 | S-KP4 |
|---|---|---|---|---|
| T-KP1 | 3.54 | 0.00 | 2.43 | 1.88 |
| T-KP2 | 4.47 | 11.44 | 0.26 | 0.00 |
| T-KP3 | 3.71 | 9.45 | 0.00 | 0.00 |
| T-KP4 | 0.00 | 13.62 | 2.73 | 5.93 |

1104

|  | S-KP1 | S-KP2 | S-KP3 | S-KP4 |
|---|---|---|---|---|
| T-KP1 | 3.54 | 0.00 | 3.68 | 1.88 |
| T-KP2 | 4.47 | 11.44 | 1.51 | 0.00 |
| T-KP3 | 3.71 | 9.45 | 1.24 | 0.00 |
| T-KP4 | 0.00 | 13.62 | 3.97 | 5.93 |
| MIN. | 0.00 | 0.00 | 1.24 | 0.00 |

STEP 3. FIND THE MIN NUMBER OF VERTICAL / HORIZONTAL LINES REQUIRED TO COVER THE ZEROS IN THE MATRIX

1108

|  | S-KP1 | S-KP2 | S-KP3 | S-KP4 |
|---|---|---|---|---|
| T-KP1 | −3.54− | −0.00− | −2.43− | −1.88− |
| T-KP2 | 4.47 | 11.44 | 0.26 | 0.00 |
| T-KP3 | 3.71 | 9.45 | 0.00 | 0.00 |
| T-KP4 | 0.00 | 13.62 | 2.73 | 5.93 |

STEP 4. NOT NEEDED, PROCEED TO STEP 5.

THE NUMBER OF LINES IS EQUAL TO m, THE OPTIMAL SOLUTION IS AVAILABLE AMONG THE COVERED ZEROS. NO NEED TO PROCEED TO STEP 4., GO TO STEP 5.
4 = m = 4 (WHERE 4 IS THE DIMENSION OF THE MATRIX)

FIG. 11

HUNGARIAN CALCULATION (CONT)

STEP 5. START THE ASSIGNMENT FROM THE ROW OR COLUMN THAT HAS THE MIN NUMBER OF ZEROS

1202:

| | S-KP1 | S-KP2 | S-KP3 | S-KP4 | |
|---|---|---|---|---|---|
| T-KP1 | -3.54- | -0.00- | -2.43- | -1.88- | 1 |
| T-KP2 | 4.47 | 1.99 | 0.26 | 0.00 | 1 |
| T-KP3 | -3.71- | -9.45- | -0.00- | -0.00- | 2 |
| T-KP4 | -0.00- | -13.62- | -2.73- | -5.93- | 1 |
| | 1 | 2 | 1 | 1 | 0 |

→ FINAL ALLOCATION
→ 3RD ALLOCATION
→ 2ND ALLOCATION

STARTED RANDOMLY HERE BECAUSE THIS ROW & COL HAD A MIN OF 1 ZERO

FIND THE VALUES ASSOCIATED TO THESE ASSIGNMENTS FROM THE ORIGINAL TABLE

1204:

| | S-KP1 | S-KP2 | S-KP3 | S-KP4 |
|---|---|---|---|---|
| T-KP1 | 11.09 | (7.55) | 11.22 | 9.43 |
| T-KP2 | 6.71 | 13.67 | 3.74 | (2.24) |
| T-KP3 | 6.71 | 12.45 | (4.24) | 3.00 |
| T-KP4 | (1.41) | 15.03 | 5.39 | 7.35 |

FINAL OBJECTIVE VALUE: 1.41 + 7.55 + 4.24 + 2.24 = 15.44

1206: PRESCOT CLOSEST MATCHING DEALS
- SCORE 15.44 -- COMPANY R
- SCORE 15.74 -- COMPANY J2
- SCORE 16.83 -- COMPANY K
- SCORE 17.61 -- UNIVERSITY MM
- SCORE 17.79 -- COMPANY DZ

FIG. 12

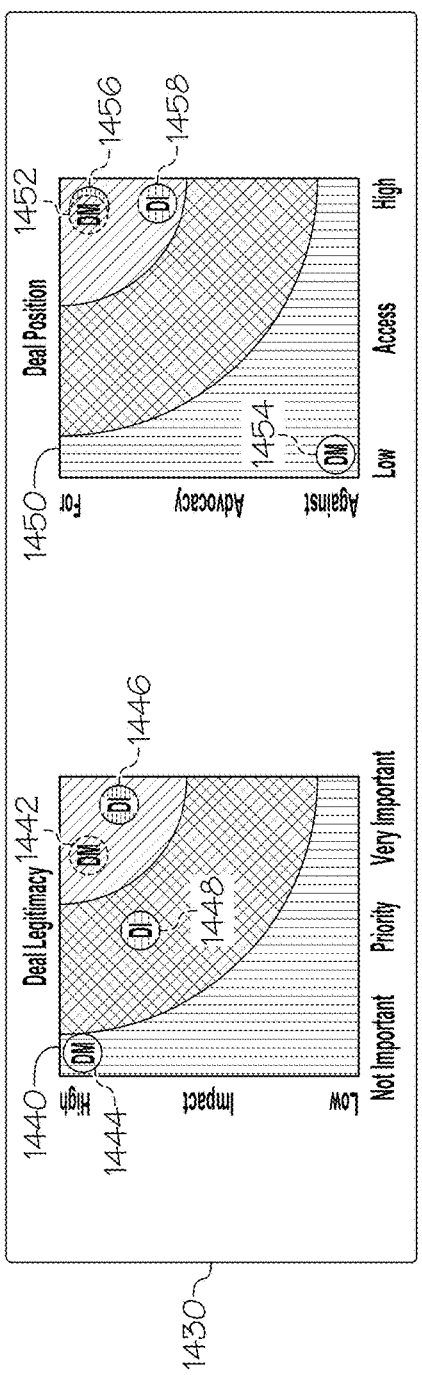
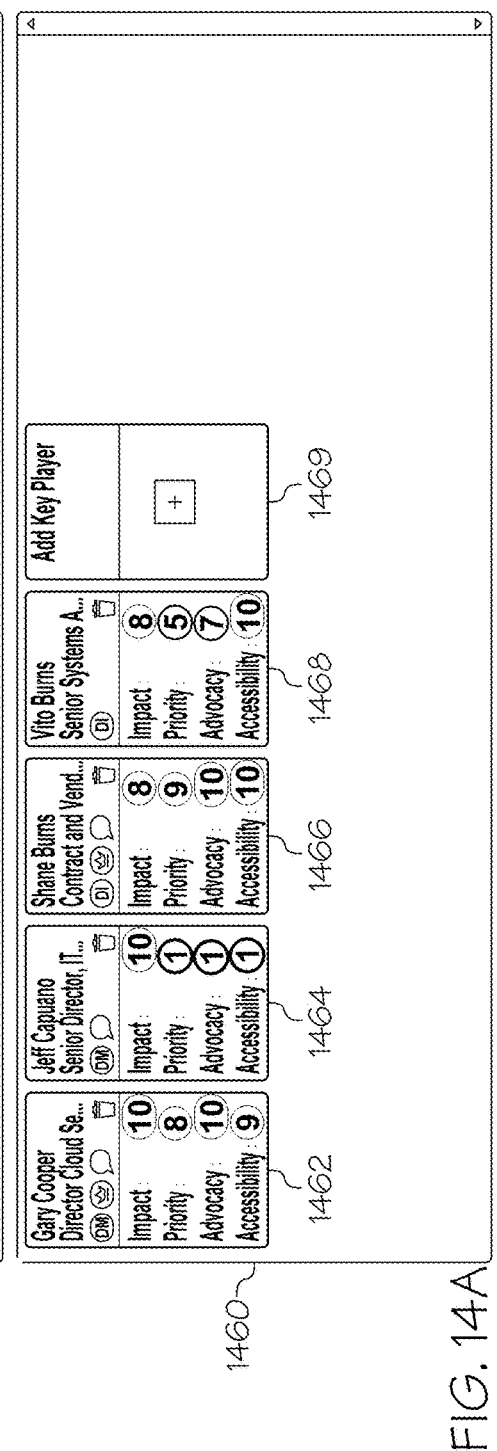
FIG. 14A

PRESCOT | ♤ CSV | ⇆ Reassign | ▭ Archive | ⊖ Lost | ♡ Won

Strengths(6) ~1472
- (S) Shane in procurement wants to save money and is an advocate for us.
- (S) Proposal meeting was asked for by End-user.
- (S) Working for Vicom so there will be no delay in getting it through the system.
- (S) Shane is more than comfortable with the price.
- (S) Gary's boss and his boss are on board to make the changes according to Shane Add a new Strength

Vulnerabilities (6) ~1474
- (V) Gary never felt comfortable with TPM.
- (V) Gary has a relationship with OEM
- (V) Have not met with Jeff yet
- (V) Gary, I still haven't been able to connect with.
- (V) Software updates and patches
- (V) Another TPM Zanzare came in with a lower price Add a Vulnerability

1470

ACTION PLAN

Show [50 ▾] entries            [+]

| △ Subject | ⇵ Commit Date |
|---|---|
| ⊕ Connect with Gary | 1/23/2020 |
| ⊕ Connect with Shane | 1/2/2020 |
| ⊕ Price Talk with Gary | 2/10/2020 |

Showing 1 to 3 of 3 entries        Previous  1  Next

Collaboration Hub

[📎]
[Submit]

1400 continued from FIG. 14A

FIG. 14B

MANAGING SALES OPPORTUNITIES WITHIN AN ORGANIZATION

CROSS REFERENCE TO RELATED APPLICATIONS

This application claims priority to and is a continuation in part of U.S. patent application Ser. No. 16/885,004, filed on May 28, 2020, entitled "Managing Sales Opportunities Within An Organization," which claims priority to a continuation in part of U.S. patent application Ser. No. 15/381,790, filed on Dec. 16, 2016, entitled "Computer-Implemented System And Methods For Providing Sales Information To Sales Professionals" which claims the benefit of U.S. Provisional Application No. 62/310,686 filed on Mar. 19, 2016, entitled "Systems And Methods For Assisting Sales Professionals in Optimizing Their Sales Results", the teaching of each of these patent applications is hereby incorporated by reference in their entirety.

FIELD OF THE DISCLOSURE

The present invention generally relates to the field of sales information providing sales information to sales professionals and, more specifically, managing sales between organizations.

BACKGROUND

Business-to-business (B2B) Sales Professionals are facing unprecedented pressure to perform—they are expected to sell more—and faster. But to be successful in today's environment, they must overcome many obstacles. A first obstacle needed to be overcome by B2B Sales Professionals is that they are underserved by technology. Tools like Customer Relationship Management (CRM) systems can result in adding an administrative burden more than they help the sales team. They are often instituted for the benefit of the company, not necessarily for that of the sales professional using them.

Another obstacle needed to be overcome by B2B Sales Professionals is that they lack the skills and resources to navigate an increasingly complex buyer landscape. With access to a wealth of information from search engines and social media, today's buyers no longer rely on salespeople for the educational component of their analysis. This means that salespeople have far less time to nurture leads through the sales process, A further obstacle needed to be overcome by B2B Sales Professionals is that research now shows that, on average, at least 5 people are required to formally sign off on a B2B purchase. The authority to make a purchase now rests within a larger group, most of who are at different stages of the buying journey.

Still, another obstacle needed to be overcome by B2B Sales Professionals is that the classroom sales training they typically receive is ineffective, expensive, and outdated. Traditional sales education techniques that were a mainstay for decades now fall short in preparing B2B sales professionals to better align themselves with today's savvy buyers.

The confluence of these factors and obstacles faced by B2B Sales Professionals has created a longer and more complex sales cycle. To solve these problems, there are a number of patents directed at sales methodologies, sales training, and sales optimization. While there have been a number of technologies and systems for facilitating sales, none have provided a simple methodology for overcoming the above mentioned obstacles.

Therefore, a long-standing need exists for simple, yet modern, sales methodologies to help Sales Professionals, such as B2B Sales Professionals, optimize their chances of winning more deals. A further need exists for novel computer-implemented systems and methods that are configured to provide sales information to sales professionals. Finally, a need exists for novel computer-implemented systems and methods that are configured to provide sales information, such as sales methodology, sales training, and sales optimization, to one or more sales professionals.

SUMMARY OF THE INVENTION

The present invention provides a novel system and method for a consistent scoring system that illustrates the likelihood of successfully closing a sales deal or sales agreement. This allows sales professionals to allocate more time on strategy where it's needed most. It guides sales professionals on eliminating vulnerabilities or weaknesses in closing a sales deal and leveraging strengths to improve the likelihood to close more sales deals successfully.

The present invention is computationally efficient in solving a combinatorial optimization algorithm. Being computationally efficient enables the present invention to be scalable in order to handle more data and transactions. The results of the present invention provide insights in which a sales organization can act upon by re-using knowledge of previous interactions with a buyer or potential buyer.

In one example, the present invention provides and system and method for managing sales within organizations. The method begins with receiving input from a user through a client device, the input identifies a set of source key members. Next, a database of a set of target key members is accessed. Stored in this database is a set of source key members and the set of target key members that include a data record with values for a plurality of additional sales attributes, such as RIPAA (Role, Impact score, Priority score, Advocacy score, and Access score) values, in a sales decision process. In one example, the process further includes a first additional sales attribute representing a number of source key players to use. Next, for each source key member in the set of source key members and each target key member in the set of target key members, performing:
1. normalizing a similarity measurement by calculating a distance between corresponding additional sales attributes in the plurality of additional sales attributes for each of the source key members with each of the target key members to form an array of similarity measurement costs; and
2. applying a combinatorial optimization algorithm for solving an assignment problem using the array of similarity measurement costs, such that one corresponding additional sales attribute of each target key member is assigned to one corresponding additional sales attribute of each source key member, whereby a total similarity measurement cost of assignment is minimized.

Next, a sub-set of target key members in the set of target key members with a lowest total similarity measurement cost of assignment is identified. The process ends by presenting the sub-set of target key members that has been identified with the lowest total similarity measurement cost of assignment to the user.

In one example, the process further includes further comprises normalizing the values for the plurality of additional sale attributes to within a numerical range for each of the source key members.

In another example, filters for and combination of
- each additional sales attribute,
- a sales status of a sales transaction, e.g., open sales transaction, a successful transaction, and an unsuccessful transaction,
- sales competitor,
- sales stage, e.g., pre-qualified, qualified, pricing, and proposal, and/or
- other text string are included as a user selection before presenting the sub-set of results.

BRIEF DESCRIPTION OF THE DRAWINGS

The accompanying figures where like reference numerals refer to identical or functionally similar elements throughout the separate views, and which together with the detailed description below, are incorporated in and form part of the specification, serve to further illustrate various embodiments and to explain various principles and advantages all in accordance with the present disclosure, in which:

FIG. 2 illustrates examples of a novel interface for providing input of a Role, an Impact score, a Priority score, an Advocacy score, and an Access score (RIPAA), according to one aspect of the present invention;

FIG. 8 is an example of a matrix of the source and target with a second order normalization of FIG. 7 as step 4 illustrating a similarity measurement costs, according to one aspect of the present invention;

FIG. 9 is an example of a matrix of the source and target using a combinatorial optimization algorithm for solving an assignment problem of the similarity measurement costs of FIG. 8 as step 5, according to one aspect of the present invention;

FIG. 10 is an example of the results of the lowest total similarity measurement costs of assignment found in FIG. 9 as step 6, according to one aspect of the present invention;

FIG. 11 is an example of using a combinatorial optimization algorithm for solving an assignment problem of the similarity measurement costs of FIG. 8, according to one aspect of the present invention;

FIG. 12 is an example of using a combinatorial optimization algorithm for solving an assignment problem of the similarity measurement costs of FIG. 11, according to one aspect of the present invention;

FIG. 14B is a novel graphical display of matching source deals and target deals of using aspects of FIG. 4 thru FIG. 13, according to an example.

DETAILED DESCRIPTION

Figure 1:
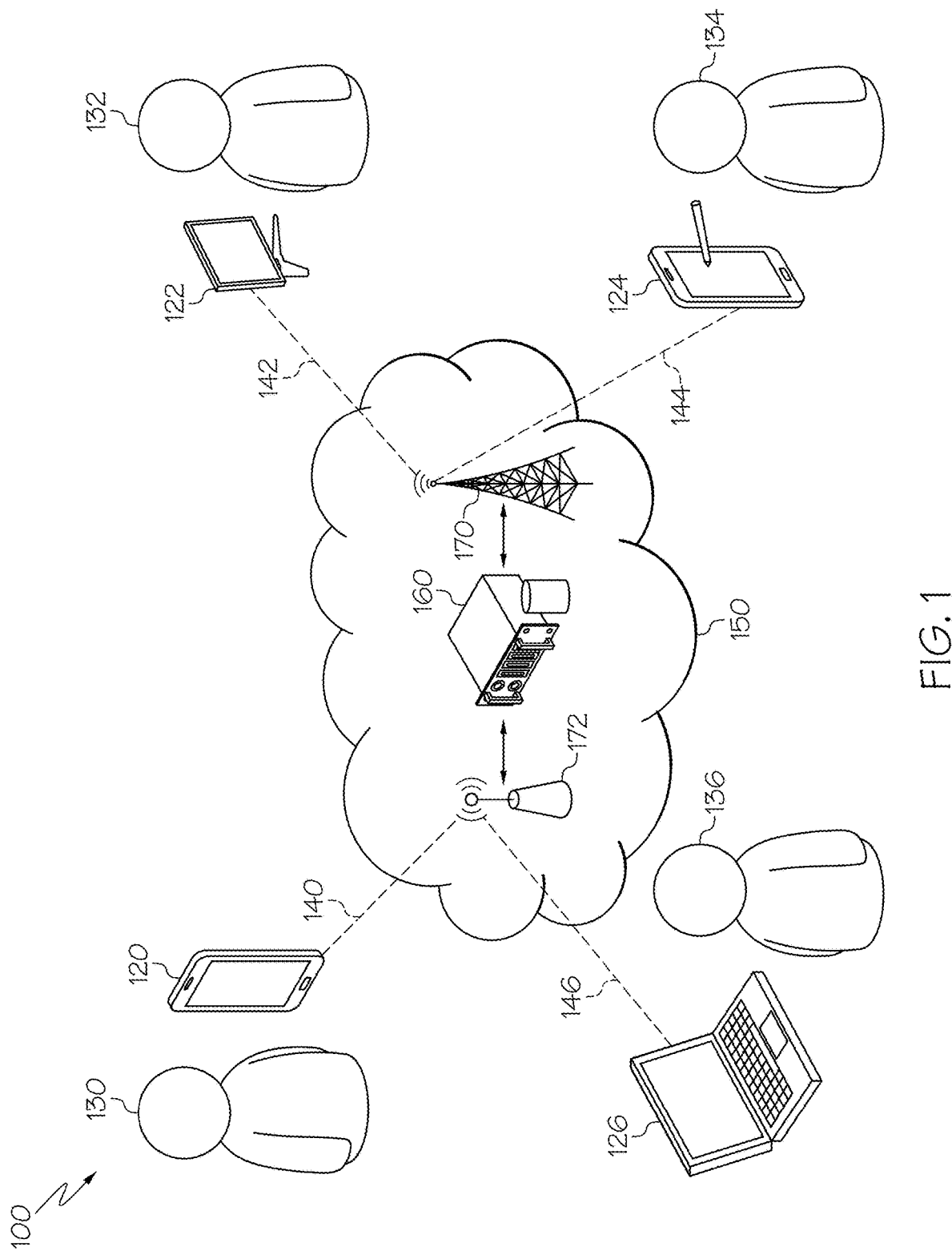
FIG. 1 illustrates a high-level client-server environment, according to one aspect of the present invention.

As required, detailed embodiments are disclosed herein; however, it is to be understood that the disclosed embodiments are merely examples and that the systems and methods described below are embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

Non-Limiting Definitions

Generally, the terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. The phrase "at least one of A and B" means either A or B separately or both A and B.

The terms "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The phrase "calculating a distance" means a distance of two points on a two dimensional or x-y place. For example, the distance in two dimensions the distance (d) between $(x_1, y_2)$ and $(x_2, y_2)$ is given by: $d=\sqrt{(x_2-x_1)^2+(y_2-y_1)^2}$. The present invention extends this concept for a distance between two groups or vectors of RIPAA values. The distance between two vectors of RIPAA values is given by $$d = \sqrt{(x_{rs} - x_{rt})^2 + (x_{is} - x_{it})^2 + (x_{ps} - x_{pt})^2 + (x_{ads} - x_{adt})^2 + (x_{acs} - x_{act})^2}$$

in which the values are Xrs=Role Source, Xrt=Role Target, Xis=Impact Source, Xit=Impact Target, Xps=Priority Source, Xpt=Priority Target, Xads=Advocacy Source, Xadt=Advocacy Target, Xacs=Accessibility Source, and Xact=Accessibility target.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple iOS phones, Android OS phones, digital music players, or any electronic device capable of running computer software and displaying information to a user, memory cards, other memory storage devices, digital cameras, external battery packs, external charging devices, and the like.

The term "combinatorial optimization algorithm" is used to find an optimal object from a finite set of objects. In many such problems, an exhaustive search is not tractable. It operates on the domain of those optimization problems in which the set of feasible solutions is discrete or can be reduced to discrete, and in which the goal is to find the best solution. Examples of combinatorial optimization algorithm include the Hungarian algorithm, the Kuhn-Munkres algorithm, the simplex algorithm, and others.

The term "computer" refers to a machine, apparatus, or device that is capable of accepting and performing logic operations from software code.

The term "computer readable medium" as used herein refers to any medium that participates in providing instructions to the processor for execution. A computer readable medium may take many forms, including but not limited to, non-volatile media, and volatile media.

The term "confirmation" is portion of the workflow for maintenance and repair in which a party, typically a requestor or dispatcher must affirmatively respond to a prompt for the workflow to continue down a maintenance path or repair path. In the event that no confirmation is received, the workflow will branch to an alternative path that puts the order in a holding or cancelled state.

The term "data network" or "network" shall mean an infrastructure capable of connecting two or more computers, such as client devices, either using wires or wirelessly, allowing them to transmit and receive data. Non-limiting examples of data networks may include the internet or wireless networks or (i.e. a "wireless network") which may include Wi-Fi and cellular networks, Bluetooth, and near field communications. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

The term "database" shall generally mean a digital collection of data or information. The present invention uses novel methods and processes to store, link, and modify information such as digital images and videos and user profile information. For the purposes of the present disclosure, a database may be stored on a remote server and accessed by a client device through the internet (i.e., the database is in the cloud) or alternatively, in some embodiments the database may be stored on the client device or remote computer itself (i.e., local storage).

The term "DEAL" shall generally refer to an agreement or compromise between a buyer, the entity seeking to make a purchase, and seller or user, the entity seeking to make a sale, to transact goods and/or services at an agreed upon price.

The term "key player" shall generally refer to any person representing the buyer entity of the DEAL and who are determined by the sales person as having a degree of influence over the success of completing the DEAL.

The phrase "normalizing values" means taking input, for example, RIPAA input, in one given range or unit of measure and scaling or converting it to a common range or numerical range. The common range is typically between 0 and 1 or between 0 and 10. The normalized data makes it easier to compare data and other statistical operations.

The term "PRESCOT" is a coined acronym for Predictive Sales Closing Tool to refer to aspects of the present invention that are being marketed by the patent owner DealCoachPro Inc.

The term "sales person" or "sales professional" generally refers to any person representing the seller entity of the DEAL and is the user of this system for the purpose of receiving aid and assistance towards the completion of one or more DEALS.

The term "sales attribute" includes one or more of Role, Impact, Priority, Advocacy and Access with the coined acronym (RIPAA). RIPAA is defined in the above-identified previous patent applications which have been incorporated by reference in the first paragraph. For convenience a summary of these terms are defined here: 1) a role of at least one key member in the set of the plurality of key members in the customer's organization in a sales decision process; 2) an impact score representing an influence of the key member in completing a sales transaction; 3) a priority score representing a level of lessor or greater importance being allocated by the key member to the sales transaction; 4) an advocacy score representing an amount of support by the key member for completion of the sale transaction; and 5) an access score representing an amount of direct access with the key member.

The term "similarity measurement" is a measure on how close two sales attributes, such as the RIPAA values, are between a source key play and target key player. It is referred to as a "costs" i.e., "similarity measurement costs" to be consistent with the language used in the literature for a combinatorial optimization algorithm. One measurement of similarity is by "calculating a distance" as described above. However other measurements of similarity between two values, especially those used in the field of statistics, can also be used.

The term "total similarity measurement costs" is a measure of assigning similarity costs such that one corresponding additional sales attribute of each target key member is assigned to one corresponding additional sales attribute of each source key member and vice-versa, that is, one corresponding additional sales attribute of each source key member is assigned to one corresponding additional sales attribute of each target key member. This assignment of costs is performed by permuting the rows and columns of a matrix of similarity measurement costs.

Overview

The present invention is a tool for salespeople to provide instant insights into key sales. These insights help each sales person or sales professional on the team provide valuable support without taking time away from the sales team to get real-time updates. The tool provides the ability to salespeople to manage and analyze customer interactions and data throughout the customer lifecycle, with the goal of improving customer relationships and assisting in driving sales.

The present invention provides a tool to help sales professional, optimize their chances of successfully completing more sale deals or DEALs. Sales information is provided to sales professionals. The sales information includes sales methodology, sales training, and sales optimization, to sales professionals. More specifically, the present invention improves the outcome of the "source" opportunity a salesrep is working on through the use of historical data which closest match the source opportunities.

The present invention provides actionable tips to guide sales professionals on eliminating vulnerabilities or weaknesses in closing a DEAL and leveraging strengths to improve the likelihood to successfully close more DEALs.

The present invention provides a consistent scoring system that illustrates the likelihood of successfully closing a DEAL. This allows sales professionals to allocate more time on strategy where it's needed most.

The present invention is computationally efficient in solving a combinatorial optimization algorithm. Being computationally efficient enables the present invention to be scalable in order to handle more data and transactions. The results of the present invention provide insights in which a sales organization can act upon by re-using knowledge of previous interactions with a buyer or potential buyer.

Client Server Environment

Turning now to FIG. 1 illustrates a high-level client-server environment, according to one aspect of the present invention. Shown are some of the physical components which may comprise a system for providing sales information to sales professionals ("the system") 100 according to some embodiments is presented. The system 100 is configured to facilitate the transfer of data and information between one or more access points 170, 172, client devices 120, 122, 124, 126, and servers 160 over a data network 150. Each client device 120, 122, 124, 126 may send data to and receive data from the data network 150 through a network connection 140, 142, 144, 146 with access points 170, 172. A data store 162 accessible by the server 160 may contain one or more databases with database records such as sales attribute values including RIPAA for target key players, as described further below. The data may comprise any information pertinent to one or more users 130, 132, 134, 136 input into the system 100, including information on or describing one or more users 130, 132, 134, 136, information on or describing one or more seller entities, information on or describing one or more buyer entities, information on or describing one or more DEALS, information requested by one or more users 130, 132, 134, 136, information supplied by one or more users 130, 132, 134, 136, and any other information which a user 130, 132, 134, 136 may be provided such as for training and educational purposes.

In this example, the system 100 comprises at least one client device 120, 122, 124, 126 (but preferably more than two client devices 120, 122, 124, 126) configured to be operated by one or more users 130, 132, 134, 136. Client devices 120, 122, 124, 126 can be mobile devices, such as laptops, tablet computers, personal digital assistants, smartphones, and the like, that are equipped with a wireless network interface capable of sending data to one or more servers 160 with access to one or more data stores 162 over a network 150 such as a wireless local area network (WLAN) 172. Additionally, client devices 120, 122, 124, 126 can be fixed devices, such as desktops, workstations, and the like, that are equipped with a wireless or wired network interface capable of sending data to one or more servers 160 with access to one or more data stores (no shown) over a wireless 170 or wired local area network 150. The present invention may be implemented on at least one client device 120, 122, 124, 126 and/or server 160 programmed to perform one or more of the steps described herein. In some embodiments, more than one client device 120, 122, 124, 126 and/or server 160 may be used, with each being programmed to carry out one or more steps of a method or process described herein.

In some embodiments, the system 100 may be configured to facilitate the communication of information to and from one or more users 130, 132, 134, 136, through their respective client devices 120, 122, 124, 126, and servers 160 of the system 100. Users 130, 132, 134, 136 of the system 100 may include one or more sales professionals and any other individual associated with a seller entity. Typically, users 130, 132, 134, 136 describe individuals that desire to create or facilitate the formation of a DEAL with a buyer entity in order to transact goods and/or services at an agreed upon price. The user 130, 132, 134, 136 may provide data and information describing a DEAL and data and information describing one or more key players to the system 100 and the system 100 may provide sales information to the user 130, 132, 134, 136 in real-time which may be used to create or facilitate the formation of the DEAL and which may otherwise not be available to the user 130, 132, 134, 136.

RIPAA Slider Assist

Figure 2:
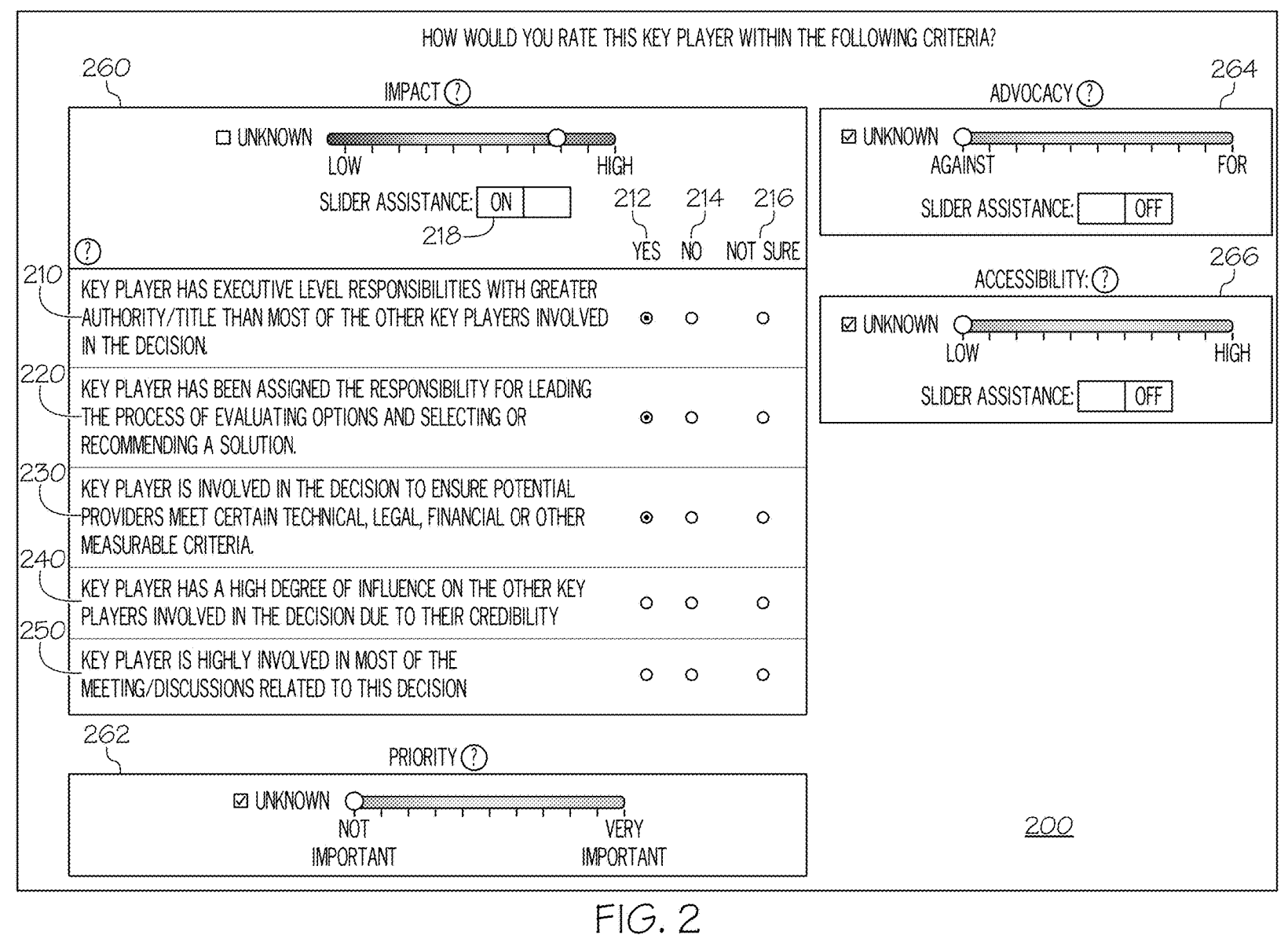

FIG. 2 illustrates examples of a novel interface 200 for providing input of a sales attribute of a customer according to one aspect of the present invention. The sales attributes can include a Role (not shown), an Impact score 260, a Priority score 262, an Advocacy score 264, and an Access score 266 (RIPAA). In this example a user is not sure how to assign a slider value to a given sales attribute (262, 264, 266). More specifically, the user is not sure how to assign an Impact score 260 using a slider. The user selects slider assist 218 to be ON. Once the slider assist is set to ON, a series of qualifying questions 210 thru 250 are presented related to the specific sales attribute. Depending on the answers from the user, e.g., Yes 212, No 214, and Not Sure 216, the sale attribute, shown as a slider, is automatically set.

RIPAA to PRESCOT

Figure 3:
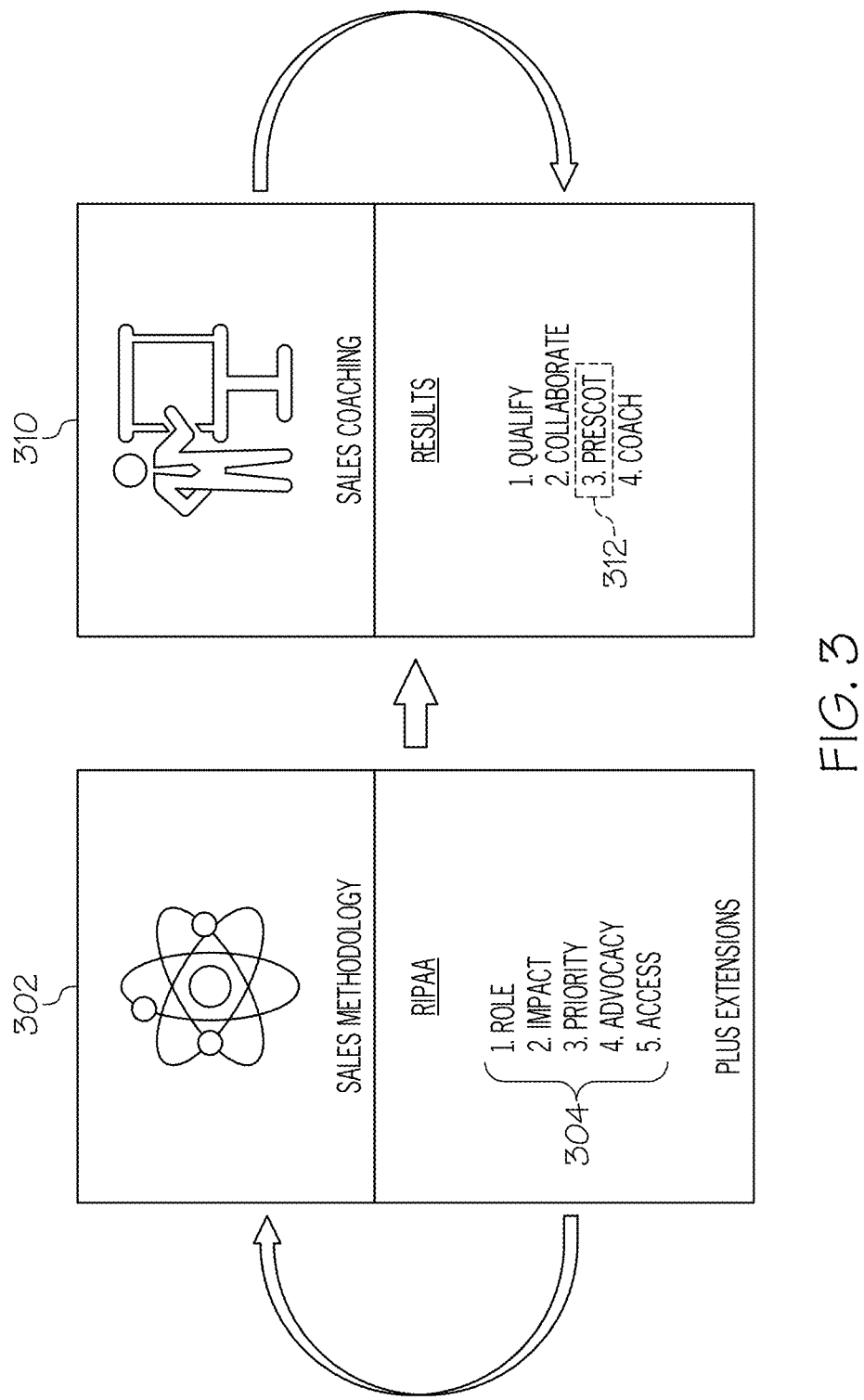
FIG. 3 illustrates the evolution of sales process from managing structured sales conversations using RIPAA to sales coaching to uncover areas of improvement with sales professionals.

FIG. 3 illustrates the evolution of the sales process from managing structured sales conversations using RIPAA to accelerating sales by using data across an organization by uncovering areas of improvements with sales professionals, according to one aspect of the present invention. The present invention builds on the sales attributes previously disclosed (RIPAA) 304 to provide PRECSOT (Predictive Sales Closing Tool) 312. As further described below, PRESCOT provides insights to other similar DEALs through using computational efficiency, namely a combination of Euclidean geometry and linear optimization. Insights are gained from other DEALS.

PRESCOT—Step 1 of Selecting or Filter a Number of Key Players

Figure 4:
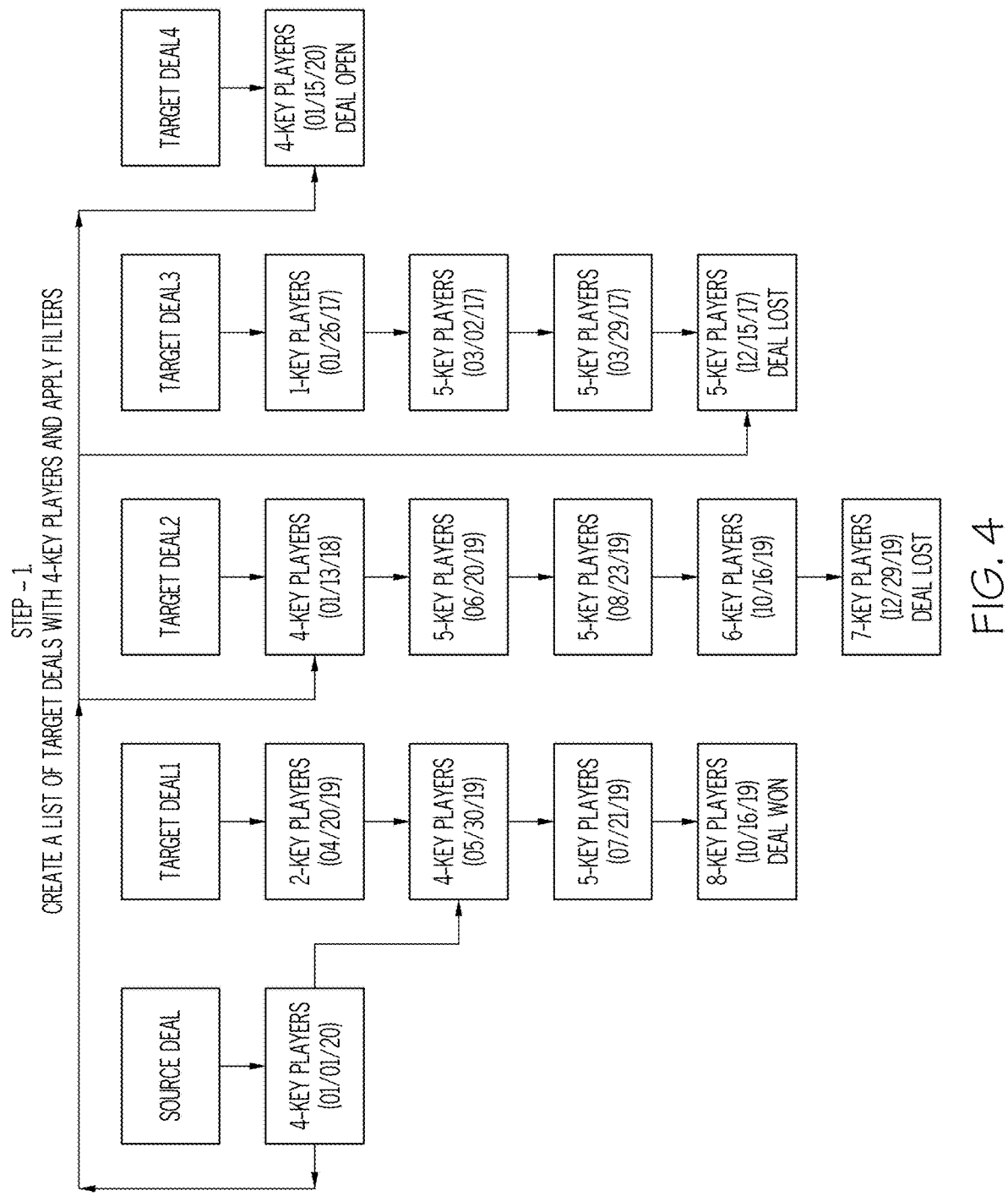
FIG. 4 is a graphical illustration of matching source deals and target deals of four (4) key players as step 1, according to one aspect of the present invention.

FIG. 4 is a graphical illustration of matching source and target deals as step 1, according to one aspect of the present invention. In this example the source deal is been selected or filter to use four (4) key players in a DEAL. Only those other previous DEALS that also have four (4) key players for each target deal (Target Deal1, Target Deal2, Target Deal3, Target Deal 4) is selected as a target. The target deals, Target Deal1, Target Deal2, Target Deal3, Target Deal 4, as part of the information in a database with RIPAA and other information previously stored for a sales organization with sales professionals. Note that the number of key players can, and often change, over time for a given DEAL-Target Deal1, Target Deal2, Target Deal3, Target Deal 4. For example, Target Deal1 shows 2 key players on a first date, four key players on a second date, five key players on a third date, and eight key players on a fourth date. Also note that each Target Deal1, Target Deal2, and Target Deal3 can have multiple instances based on time i.e., snap-shots. Where Target Deal4 is shown with only one snap-shot. In one example the system defaults to using the most recent match of five key players in Target Deal3 as shown. However, other filters; such deals within a certain time period can be identified.

Figure 5:
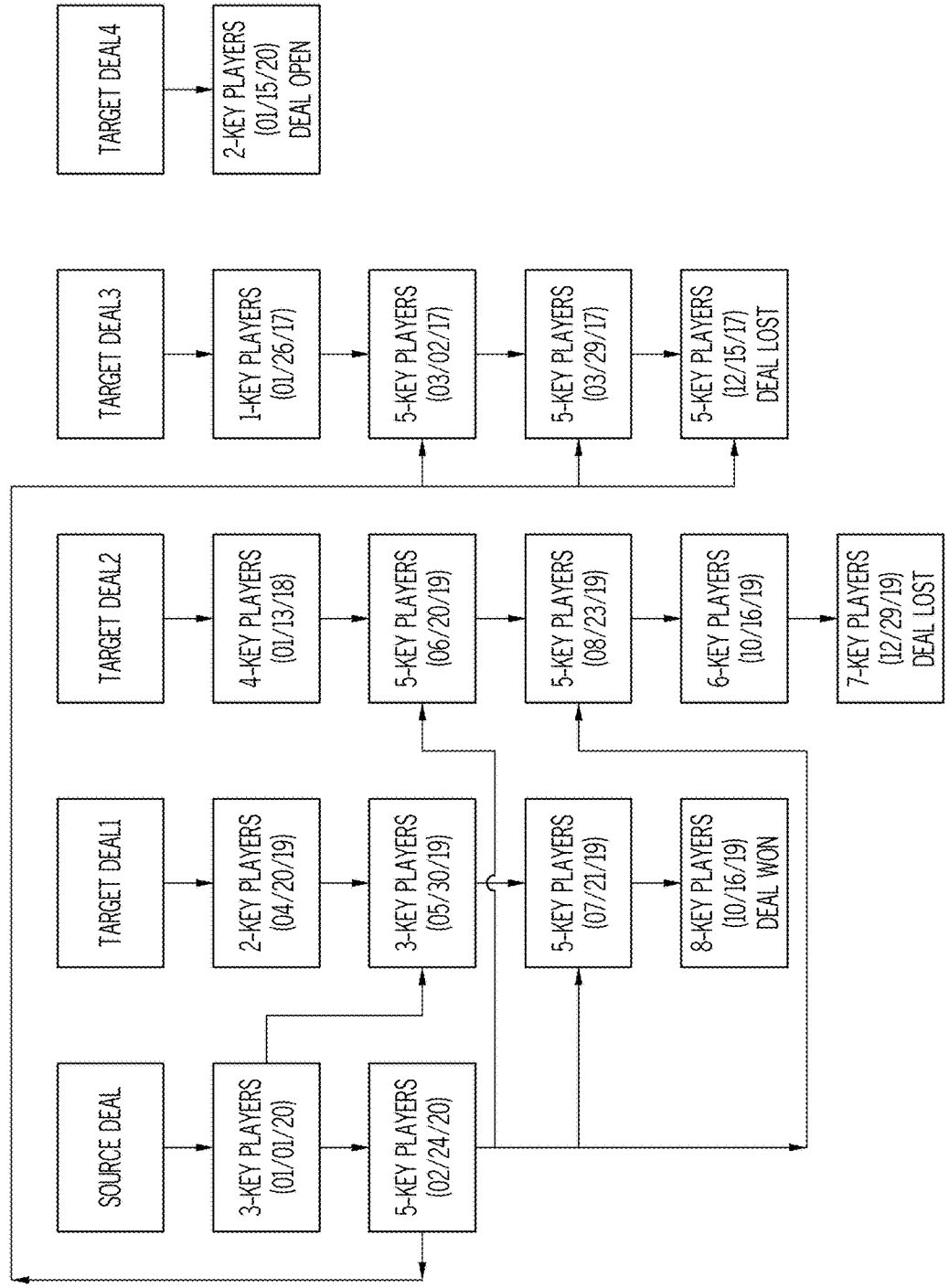
FIG. 5 is another graphical illustration of matching source deals and target deals as step 1 with five (5) key players in comparison to four (4) key players in FIG. 4, according to another aspect of the present invention.

Turning now FIG. 5 shown is another graphical illustration of matching source and target deals as step 1 with five (5) key players in comparison to four (4) key players in FIG. 4. Note that the information for the given deals DEAL-Target Deal1, Target Deal2, Target Deal3, Target Deal 4 are identical as that of FIG. 4. However, because a filter or choice was made to use five (5) key players to compare a source deal to the target deals, the target deals selected are different than the target deals selected in FIG. 4.

PRESCOT—Step 2 of Placing RIPPA Values in Matrix

Figure 6:
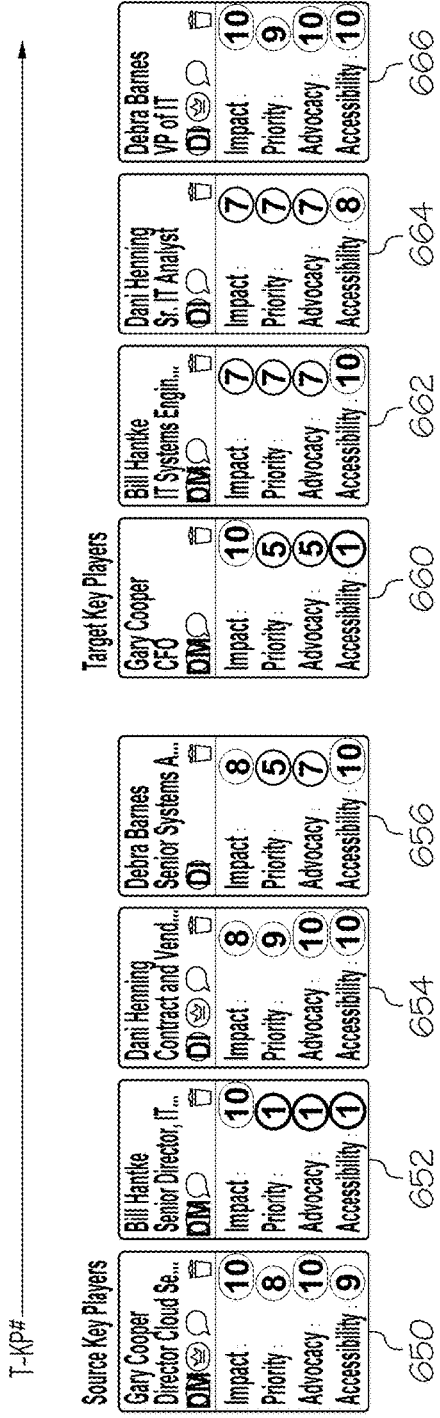
FIG. 6 is an example of a matrix of the source key players and target key players illustrating RIPAA values of the deals of FIG. 4 as step 2, according to one aspect of the present invention.

FIG. 6 is an example of a matrix 602 of the source key players and target key player of FIG. 4 as step 2, according to one aspect of the present invention. In this matrix representation 602, the RIPAA values and other values of the Source Team Key Players (S-KP) are shown across the top of the matrix as S-KP 1, S-KP 2, S-KP 3, S-KP 4. The top row of each cell 610 thru 646 is the RIPAA values for each Source Team Key Player 650 thru 656. Going down the matrix are the Target Key Players (T-KP) as T-KP 1, T-KP 2, T-KP 3, T-KP 4. The bottom row of each cell 610 thru 646 is the RIPAA values for each Target Team Key Player 660 thru 666.

PRESCOT—Step 3 of First Order Normalization

Figure 7:
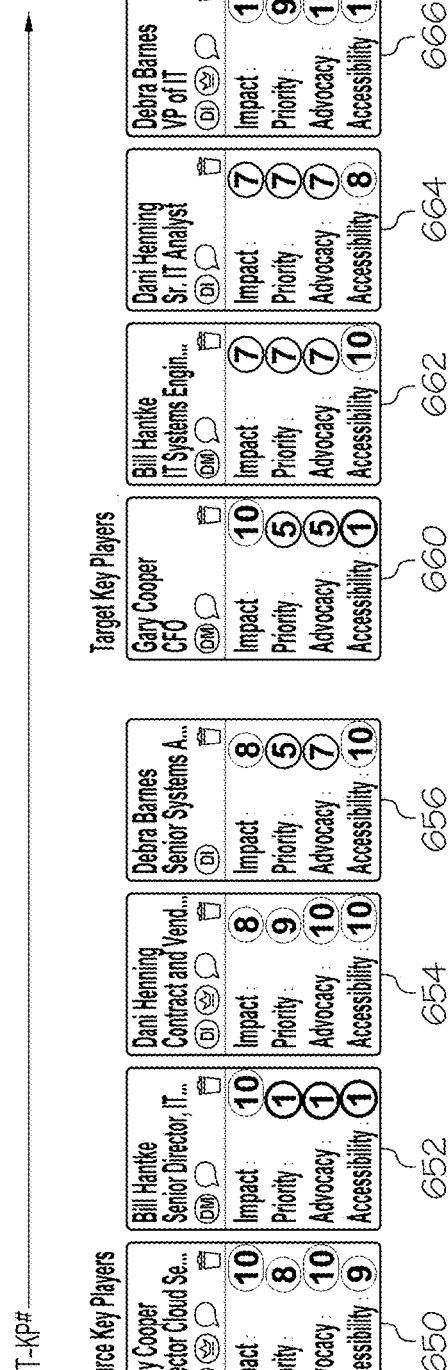
FIG. 7 is an example of a matrix of the source and target with a first order normalization of FIG. 6 as step 3, according to one aspect of the present invention.

FIG. 7 is an example of a matrix 702 of the source and target with a first order normalization of FIG. 6 as step 3, according to one aspect of the present invention. Note all the values from FIG. 6 (top row and bottom row) for each cell 710 thru 746 are normalized within a given range. In this example the range is 1 to 10. A decision maker is assigned a value of 10, whereas a decision influencer is assigned a value of 5 however it is important to note that other values and ranges could be used within the true scope and spirit of the present invention.

PRESCOT—Step 4 of Second Order Normalization

FIG. 8 is an example of a matrix 802 of the source and target with a second order normalization of FIG. 7 as step 4, according to one aspect of the present invention. The second order normalization in this example uses a version of the distance formula. Here each RIPAA set of values (Role, Impact, Priority, Advocacy and Access with the coined acronym) or vector a Source Team Key Player is compared against each RIPAA set of value or vector of each Target Team Key Player $$d = \sqrt{(x_{rs} - x_{rt})^2 + (x_{is} - x_{it})^2 + (x_{ps} - x_{pt})^2 + (x_{ads} - x_{adt})^2 + (x_{acs} - x_{act})^2}.$$

850. The top and bottom values of each cell 710 thru 746 shown in FIG. 7 is placed in the formula 850 above. The results of each cell 810 thru 846 shown in FIG. 8. The values 852 are Xrs=Role Source, Xrt=Role Target, Xis=Impact Source, Xit=Impact Target, Xps=Priority Source, Xpt=Priority Target, Xads=Advocacy Source, Xadt=Advocacy Target, Xacs=Accessibility Source, and Xact=Accessibility target. This results in a RIPAA proximity score or distance score for each cell as shown.

PRESCOT—Step 5 of Combinatorial Optimization Algorithm Normalization

FIG. 9 is an example of a matrix 902 of the source and target using a combinatorial optimization algorithm for solving an assignment problem of the similarity measurement costs of FIG. 8 as step 5, according to one aspect of the present invention. In this example, the Hungarian Algorithm is run across all cells cell 810 thru 846 in the matrix 802 of FIG. 8. The results of the Hungarian Algorithm are placed in each cell 910 thru 946 as shown. Examples of how the Hungarian Algorithm works in a matrix formulation is found here at online URLs (https://en.wikipedia.org/wiki/Hungarian_algorithm) and (https://www.youtube.com/watch?v=rrfFTdO2Z7I) and (https://www.youtube.com/watch?v=ezSx8OyBZVc), the teachings of which, are hereby incorporated by reference in their entirety. This is further described below with reference to FIG. 11 and FIG. 12.

In the matrix formulation, we are given a nonnegative n×n matrix, where the element in the i-th row and the j-th column represents the RIPAA values of the j-th Source Team Key Player compared, by the distance formula above, to the RIPAA values of the i-th Target Team Key Player. The Hungarian Algorithm finds a combination of source to target to source RIPAA values, such that RIPAA vector for each Source Team Key Player compared with RIPAA value of each Target Key Player is minimum.

Stated differently, note that the combinatorial optimization algorithm is to find the lowest comparison value using each column of the matrix. It is the overall value not the minimum value per column or per row that is found. The values that are circled in the cell on the matrix on show combination of values found from a finite set of objects. Here is shown that the minimum combination of values (circled in each column) across the matrix 902 is given by 1.41+7.55+4.24+2.24=15.44. It is important to note that the Hungarian does not find the smallest value per row or per column but rather the lowest value of values across the entire matrix for each row. This will be further described below in the section entitled Combinatorial Optimization Algorithm.

Proximity of DEALS Analyzed

FIG. 10 is an example of the results of lowest sub-set of proximity deals analyzed in FIG. 9 as step 6, according to one aspect of the present invention. Shown is a ranking 1002 of five of the results target key players of the Hungarian Algorithm with the lowest scores (i.e. the highest proximity of the RIPAA values of source key players compared with the RIPPA values of target key players. Note the lower the score, the more closely match the deal. Shown are Company R, Company J2, Company K, University MM, Company DZ.

Combinatorial Optimization Algorithm Example

FIG. 11 is an example of using a combinatorial optimization algorithm for solving an assignment problem of FIG. 8, according to one aspect of the present invention. For simplicity, the values in cell for table 1102 match the values in cells 810 thru 846 in table 802 of FIG. 8. Values. In step 1, the minimum is identified for each row. These minimum values are shown in the right most column of table 1102. This minimum value for each row is subtracted for each cell value in that row resulting in table 1104 as shown. Next, the minimum value for each column is identified. The minimum value for each column is shown in the bottom row of table 1104. The minimum value for each column is subtracted from each cell value in that column resulting in table 1106 as shown in step 2. Next in step 3, as shown in table 1108, the minimum number of vertical and horizontal lines are identified to cover each zero in the matrix a shown in table 1108. The total number of lines required to cover each zero is compared against the dimension of the matrix. In the event the number of lines is less than the dimension of the matrix, the optimal solution is not yet identified. Otherwise, if the number of lines is equal to the dimension of the matrix, the optimal solution is identified. In this example, there are four (4) lines needed. The dimension m of the matrix is 4. Since m=four (4) lines, the optimal solution, is found. If Step 4 is required, the process follows these sub-steps of:
  a. Find the lowest value from the list of values that are uncovered (no lines running through them).
  b. Subtract the lowest value from the uncovered values.
  c. Add the lowest value to the values where the lines intersect
  d. Replay Step 3, whereby the goal is to find a scenario where the minimum number of vertical/horizontal lines match the matrix value m=4 in this scenario. Once achieved, the process continues to step 5.

Step 5 is shown in FIG. 12 matrix 1202. The process begins with the row or column that has the minimum number of zeros. The number of zeros for each column is shown in the bottom row and the number of zeros for each column is shown in the right most column. Note that it is possible for a row or column to have more than one zero. In this example there are a few rows or columns with only one zero. In one example the process begins randomly from the row or column with the minimum numbers of zeros. It does not matter where the process starts the assignment as long as the row or column has the minimum number of zeros. Note the allocated cell match the cells identified in matrix 902 in FIG. 9 above.

Generating Reports

Figure 13:
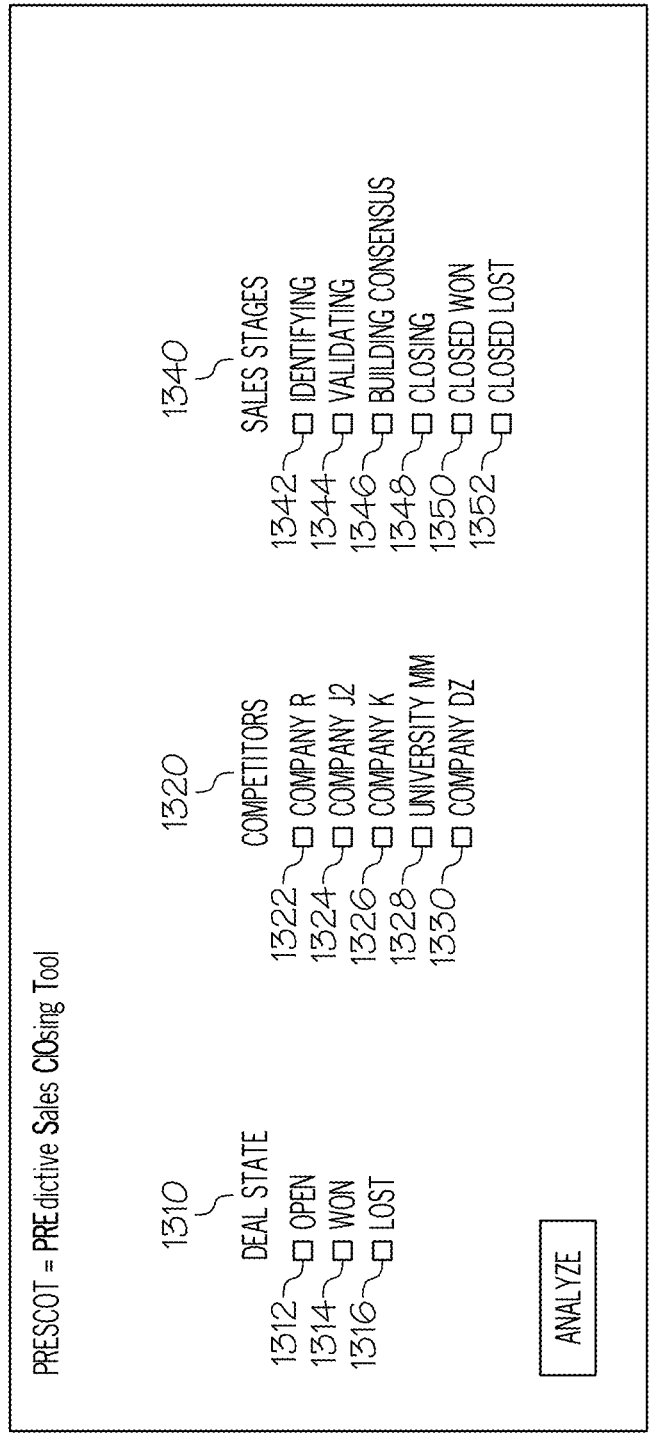
FIG. 13 illustrates the filtering of matching source deals and target deals, according to an example; and FIG. 14A

FIG. 13 illustrates filtering of matching source and target deals of FIG. 13, according to an example based on one more characteristics. The characteristics status of the deal state 1310. The deal state 1310 shown are open 1312, won 1314, and lost 1316. Another characteristic is Competitors 1320. Competitors are companies 1322 through 1330. The characteristics of stages of deals 1340. In one example the Sales Stages are setup by the company. The sales stages can be thought of as a company's funnel. Different companies typically setup these stages differently. The Deal state is either open, won or lost. The characteristic of stages of deals are identifying 1342, validating 1344, building consensus 1346, closing 1348, closed won 1350, and closed lost 1352.

FIG. 14 is a novel graphical display of matching source and target deals of using aspects of FIG. 4 thru FIG. 13, according to an example. Note that some of the selections for filters from FIG. 13 are shown at top portions 1410, 1420. The selection of filters shown are deal owner 1412, competitors 1414, close date 1422, sales stage 1424, value 1426. In section 1430. Shown are two graphs deal legitimacy 1440 and deal position 1450. Shown are each of the target key players 1442 thru 1448 with their RIPAA values graphed. For convenience 1442, 1452 matches 1462, 1444, 1454 matches 1464, 1446, 1456 matches 1466 and 1448, 1458 matches 1468.

Also shown in area in 1470 in strengths 1472 and vulnerabilities 1474 listed from notes for source key player.

Overall Process Flow

Figure 15:
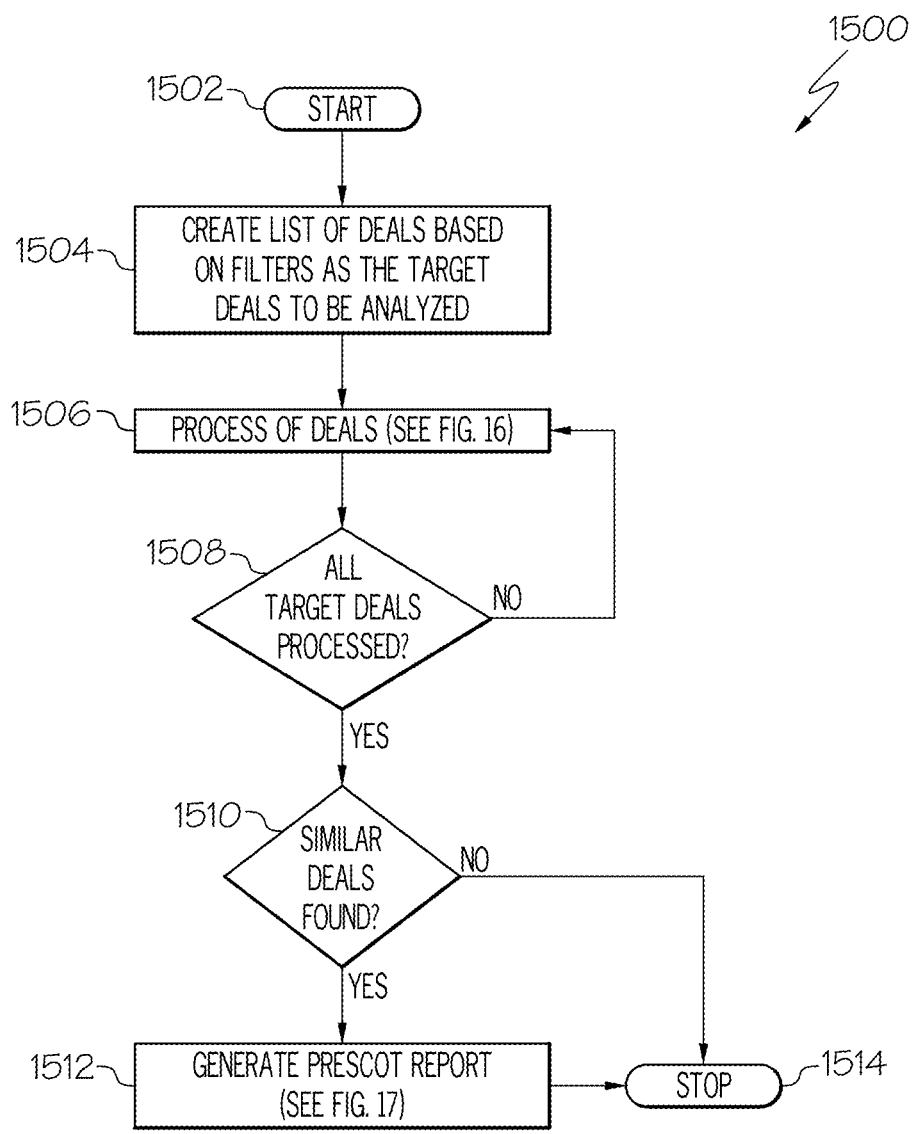
FIG. 15 is an overall process flow of managing sales within an organization, according to an example.

FIG. 15 is an overall process flow 1500 of managing sales with an organization, according to an example. The process begins in step 1502 and immediately proceeds to step 1504. In step 1504 a list of previous deals (i.e., target deals) is retrieved from more databases with database records such as sales attribute values, including RIPAA for target key players. This list or set of target key players is based on the number of key players to match in the source deal. Two examples of a number of key players, one for four (4) key members is shown in FIG. 4 and one for five (5) key members is shown in FIG. 5. The process proceeds to step 1506.

In step 1506 the RIPPA values for the source deal with the given number of key plays is compared to each target deal identified in step 1504 each with the same number of given number of key players. This is described in Step 1 through Step 6 above with reference to FIG. 5 thru FIG. 10 above. More details are described in FIG. 16 below. The process continues to step 1508.

In step 1508, a test is made to see if all the targets deals identified in step 1504 are processed. In response to more target deals identified to be processed, then the process continues back to step 1506 to be processed. Otherwise, in response to no more target deals to be processed, then the flow continues to step 1510.

In step 1510, target deals found that have the lowest of the combinatorial optimization algorithm as compared with a settable threshold are identified. The settable threshold allows a use to define how close of comparison of RIPAA values of source to the target are identified. In one example, just the lowest scores of the combinatorial optimization algorithm are identified for the source compared with the target deals. The identified targets are used to create a report in step 1512 (described further in FIG. 16 below) and the process ends in step 1514. Otherwise, if source deals compared with target deals within a given threshold are not found, the process ends in step 1514.

Figure 16:
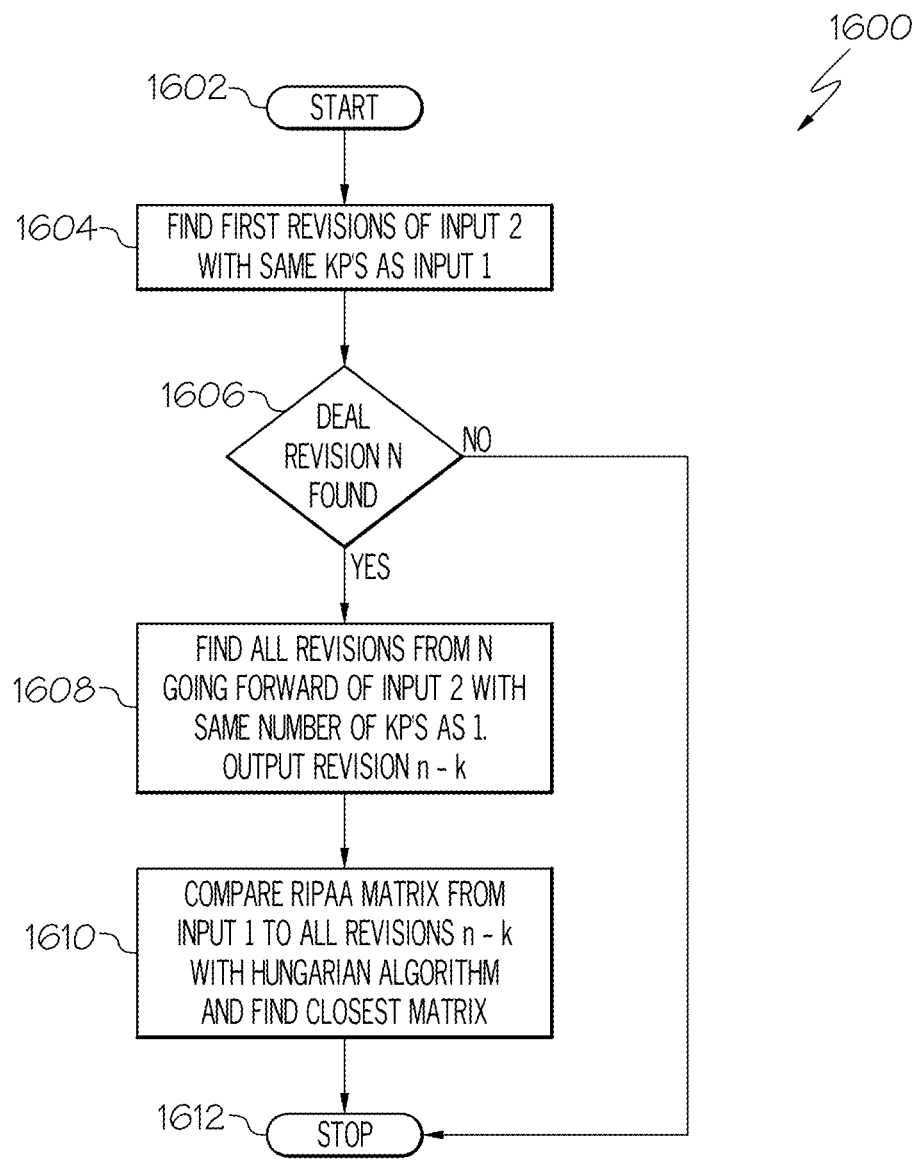
FIG. 16 is an overall process flow of finding matching deal attributes of FIG. 15, according to an example.

FIG. 16 is an overall process flow 1600 of finding matching deal attributes of step 1506 in FIG. 15, according to an example. The process starts in step 1600 and immediately proceeds to step 1602.

In step 1602 the number of key players in source and target are searched. As described above with reference to FIG. 4 and FIG. 5, there may be one or more snap shots in time that have a number of key players that match the source key members. Stated differently each target deal may, over time, have more than one instance or revision of key players that match to source key members. The process continues to step 1604.

In step 1604 a test is made is made to see if any target deals have revisions that match the number key players in the source deal. In response to a target deal if no deal revisions is found the process continues to step 1610 to end. Otherwise, there are revisions in target deals in which the number of key players match the source deal. The process continues to step 1606.

In step 1606 all the revisions in the target deal with the same number of key players as the source key player are identified and the process flows to step 1608.

In step 1608, the RIPPA values for the source deal with the given number of key plays is compared to each target deal revision identified in step 1606 each with the same number of given number of key players. This is described in Step 1 through Step 6 above with reference to FIG. 5 thru FIG. 10 above. The process continues to step 1610 to end.

Figure 17:
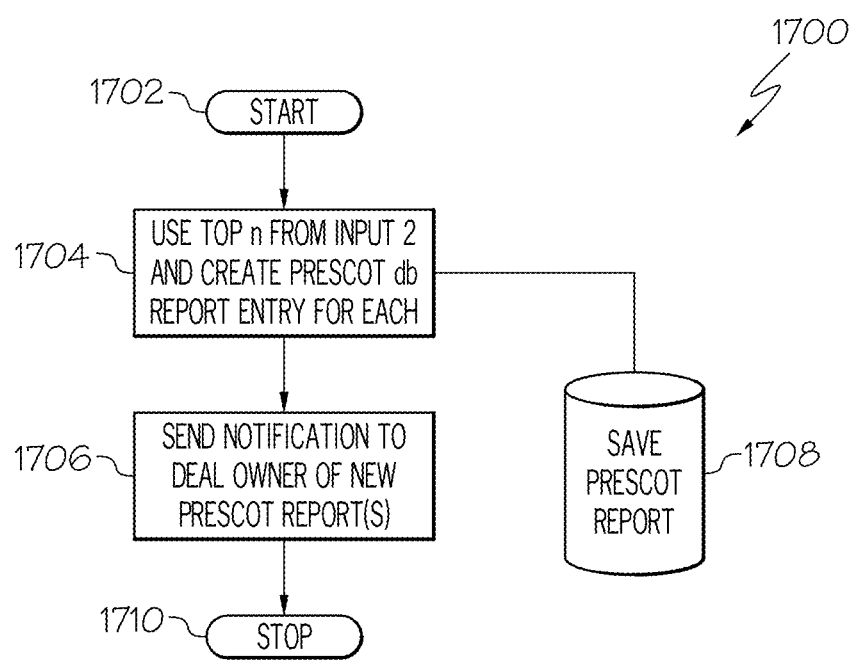
FIG. 17 is an overall process flow of generating reports of FIG. 15, according to an example.

FIG. 17 is an overall process flow 1700 of generating reports of FIG. 17, according to an example. The process starts in step 1702 and proceeds to step 1704. In step 1704 the top n matching deals is identified. For example for n=5 the top five target deals as shown in FIG. 10. The number n is settable by the user.

Non-Limiting Examples

Although specific embodiments of the subject matter have been disclosed, those having ordinary skill in the art will understand that changes are made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A computer implemented method for managing sales within organizations, the method comprising:
   receiving a role of at least one key member in a set of a plurality of key members in a customer's organization in a sales decision process;
   for the set of a plurality of key members, receiving input by a user through a client device, the input comprises data for populating a data record with values within a given numeric range for one or more attributes for each key member in the set of the plurality of key members including:
      an impact score representing an influence of the key member in completing a sales transaction;
      a priority score representing a level of lessor or greater importance being allocated by the key member to the sales transaction;
      an advocacy score representing an amount of support by the key member for completion of the sale transaction; and
      an access score representing an amount of contact, with the key member;
   for a given key member in the set of the plurality of key members, retrieving a set of at least one rule each with a set of at least one or more conditions per given rule, and for a given rule in the set of at least one rule performing:
      for a given condition in the set of at least one or more conditions performing:
         identifying whether the given condition in the set of at least one or more conditions per given rule in the set of at least one rule applies to the one or more attributes for the given key member in the set of the plurality of key members; and
         in response to the given condition applying to the given key member for the given rule in the set of at least one rule, adding a given condition score to a given rule score;
   adding the given condition score for each given rule score to a total deal score;
   retrieving a set of one or more recommendations based on the total deal score; and
   automatically displaying to the user, via a display screen of the client device, the set of one or more recommendations as positions in a graph, for at least one key member in the set of the plurality of key members at least one of
      a deal legitimacy graph with one axis representing the impact score and another representing the priority score, wherein a deal legitimacy position on the deal legitimacy graph for at least one key member in the set of the plurality of key members are based on the impact score and the priority score, and the deal legitimacy position is relative to a first straight line graph with a constant slope,
      a deal position graph with one axis representing the advocacy score and another axis representing the access score, wherein a deal position on the deal position graph for at least one key member in the set of the plurality of key members are based on the advocacy score and the access score, and the deal position is relative to a second straight line graph with a constant slope, or
      both the deal legitimacy graph and the deal position graph.

2. The method of claim 1, wherein the set of one or more recommendations is associated with an observation.

3. The method of claim 2, wherein the observation is selected from the group consisting of a strength and a vulnerability.

4. The method of claim 3, wherein the set of one or more recommendations comprises a pre-recorded video multimedia file specific for the observation.

5. The method of claim 1, whereby a non-numeric value of the role is converted to the given numeric range prior to adding the given condition score to the given rule score.

6. The method of claim 1, further comprising:
   determining a legitimacy value corresponding to a legitimacy of a deal, wherein the data used to determine the legitimacy value comprises the impact score of each key member and the priority score of each key member.

7. The method of claim 1, further comprising:
   determining a position value corresponding to a position of a deal, wherein the data used to determine the position value comprises the advocacy score of each key member and the access score of each key member.

8. The method of claim 1, further comprising:
   determining a legitimacy value corresponding to a legitimacy of a deal, wherein the data used to determine the legitimacy value comprises the impact score of each key member, the role data of each key member, and the priority score of each key member, and
   determining a position value corresponding to the position of a deal, wherein the data used to determine the position value comprises an advocacy score of each key member, a role data of each key member, and an access score of each key member.

9. The method of claim 1, further comprising determining a total deal score, wherein one or more rule scores are used to determine the total deal score.

10. The method of claim 8, wherein the total deal score is calculated from a combination of a close date confidence score, a deal value confidence score, a rule score, and a sales stage confidence score.

11. A computer implemented system for managing sales within a plurality of organizations, the system comprising:
    a computing platform having a hardware processor, a memory in communication with the processor, the hardware processor performing
    receiving a role of at least one key member in a set of a plurality of key members in a customer's organization in a sales decision process;
    for the set of a plurality of key members, receiving input by a user through a client device, the input comprises data for populating a data record with values within a given numeric range for one or more attributes for each key member in the set of the plurality of key members including:
       an impact score representing an influence of the key member in completing a sales transaction;

a priority score representing a level of lessor or greater importance being allocated by the key member to the sales transaction;
an advocacy score representing an amount of support by the key member for completion of the sale transaction; and
an access score representing an amount of contact, with the key member;
for a given key member in the set of the plurality of key members, retrieving a set of at least one rule each with a set of at least one or more condition per given rule, and for a given rule in the set of at least one rule performing:
for a given condition in the set of at least one or more conditions performing:
identifying whether the given condition in the set of at least one or more conditions per given rule in the set of at least one rule applies to the one or more attributes for the given key member in the set of the plurality of key members; and
in response to the given condition applying to the given key member for the given rule in the set of at least one rule, adding a given condition score to a given rule score;
adding the given condition score for each given rule score to a total deal score;
retrieving a set of one or more recommendations based on the total deal score; and
automatically displaying to the user, via a display screen of the client device, the set of one or more recommendations as positions in a graph, for at least one key member in the set of the plurality of key members at least one of
a deal legitimacy graph with one axis representing the impact score and another representing the priority score, wherein a deal legitimacy position on the deal legitimacy graph for at least one key member in the set of the plurality of key members are based on the impact score and the priority score, and the deal legitimacy position is relative to a first straight line graph with a constant slope,
a deal position graph with one axis representing the advocacy score and another axis representing the access score, wherein a deal position on the deal position graph for at least one key member in the set of the plurality of key members are based on the advocacy score and the access score, and the deal position is relative to a second straight line graph with a constant slope, or
both the deal legitimacy graph and the deal position graph.

12. The system of claim 11, wherein the set of one or more recommendations is associated with an observation.

13. The system of claim 12, wherein the observation is selected from the group consisting of a strength and a vulnerability.

14. The system of claim 13, wherein the set of one or more recommendations comprises a pre-recorded video multimedia files specific for the observation.

15. The system of claim 11, whereby a non-numeric value of the role is converted to the given numeric range prior to adding the given condition score to the given rule score.

16. The system of claim 11, further comprising:
determining a legitimacy value corresponding to a legitimacy of a deal, wherein the data used to determine the legitimacy value comprises the impact score of each key member and the priority score of each key member.

17. The system of claim 11, further comprising:
determining a position value corresponding to the position of a deal, wherein the data used to determine the position value comprises the advocacy score of each key member and the access score of each key member.

18. The system of claim 11, further comprising:
determining a legitimacy value corresponding to a legitimacy of a deal, wherein the data used to determine the legitimacy value comprises the impact score of each key member, the role data of each key member, and the priority score of each key member, and
determining a position value corresponding to the position of a deal, wherein the data used to determine the position value comprises the advocacy score of each key member, the role data of each key member, and the access score of each key member.

19. The system of claim 11, further comprising determining a total deal score, wherein one or more rule scores are used to determine the total deal score.

20. The system of claim 18, wherein the total deal score is calculated from a combination of a close date confidence score, a deal value confidence score, a rule score, and a sales stage confidence score.

* * * * *